United States Patent

Lucas

[15] 3,702,998
[45] Nov. 14, 1972

[54] METHOD AND APPARATUS FOR OPERATING A SINGLE SENSOR TO HAVE THE PROPERTIES OF AN ARRAY OF SENSORS

[72] Inventor: Raymond David Lucas, Sunnyvale, Calif.

[73] Assignee: GTE Sylvania Incorporated

[22] Filed: March 3, 1970

[21] Appl. No.: 16,035

[52] U.S. Cl..................340/258 R, 340/261, 340/15, 343/7.3
[51] Int. Cl. ..............................................G08b 13/00
[58] Field of Search ...340/258 C, 258 B, 258 R, 261, 340/15, 15.5, 258 D, 276; 343/7.3

[56] References Cited

UNITED STATES PATENTS

| | | | |
|---|---|---|---|
| 3,599,197 | 8/1971 | Boyko | 340/258 R |
| 3,036,219 | 5/1962 | Thompson | 340/258 B UX |

Primary Examiner—John W. Caldwell
Assistant Examiner—Michael Slobasky
Attorney—Norman J. O'Malley, Russell A. Cannon and John F. Lawler

[57] ABSTRACT

Seismic signals in the area of detection associated with a single geophone sensor are received by the sensor, amplified in a variable gain amplifier, and analyzed by a processor to determine whether they are produced by an intruder moving in the detection area. The output of the processor is applied to logic circuitry which automatically decreases the amplifier gain, and thus the size of the detection area, when the received signal is produced by an intruder. If the processor produces outputs indicating intrusion of the detection area for a prescribed number of successively smaller areas of detection within a predetermined time interval, logic circuitry produces an alarm signal indicating that an intruder is in a detection area.

17 Claims, 6 Drawing Figures

INVENTOR.
RAYMOND D. LUCAS

BY *Russell D. Cannon*

AGENT

INVENTOR.
RAYMOND D. LUCAS

BY *Russell A Cannon*

AGENT

METHOD AND APPARATUS FOR OPERATING A SINGLE SENSOR TO HAVE THE PROPERTIES OF AN ARRAY OF SENSORS

BACKGROUND OF INVENTION

This invention relates to intrusion detection systems and more particularly to such a system wherein a single sensor is operated to have the properties of an array of sensors.

In reconnaissance operations it is tiring and sometimes dangerous for a human observer to visually monitor, even from a distance, pedestrian or vehicle traffic on a path. This function is accomplished automatically and electronically in a prior art system comprising an array of sensors that are each located on the side of a path and spaced apart so that adjacent sensors have overlapping areas of detection on the path. Each sensor produces an output signal when an intruder moves in the associated detection area. A processor responsive to the sensor outputs produces an alarm indicating that an intruder is moving on the path when particular outputs of a prescribed number of sensors are sequentially received within a predetermined time interval.

An object of this invention is the provision of an improved and simplified system wherein a single sensor is operated to have the properties of an array of sensors.

SUMMARY OF INVENTION

In accordance with this invention, the false alarm rate of an intruder detection system is reduced by decreasing the size of the area of detection provided by a sensor and associated control circuitry each time the processed output thereof indicates intrusion of the associated detection area and requiring indications of intrusion of a prescribed number of detection areas of successively smaller size within a predetermined time interval before initiation of an alarm indicating intrusion of a prescribed detection area. In this manner, the sensor and associated control circuitry may be adjusted to indicate intrusion of the particular detection area only when the pattern of sensor signal activity duplicates that associated with an intruder approaching the sensor.

DESCRIPTION OF PREFERRED EMBODIMENTS

Figure 1:
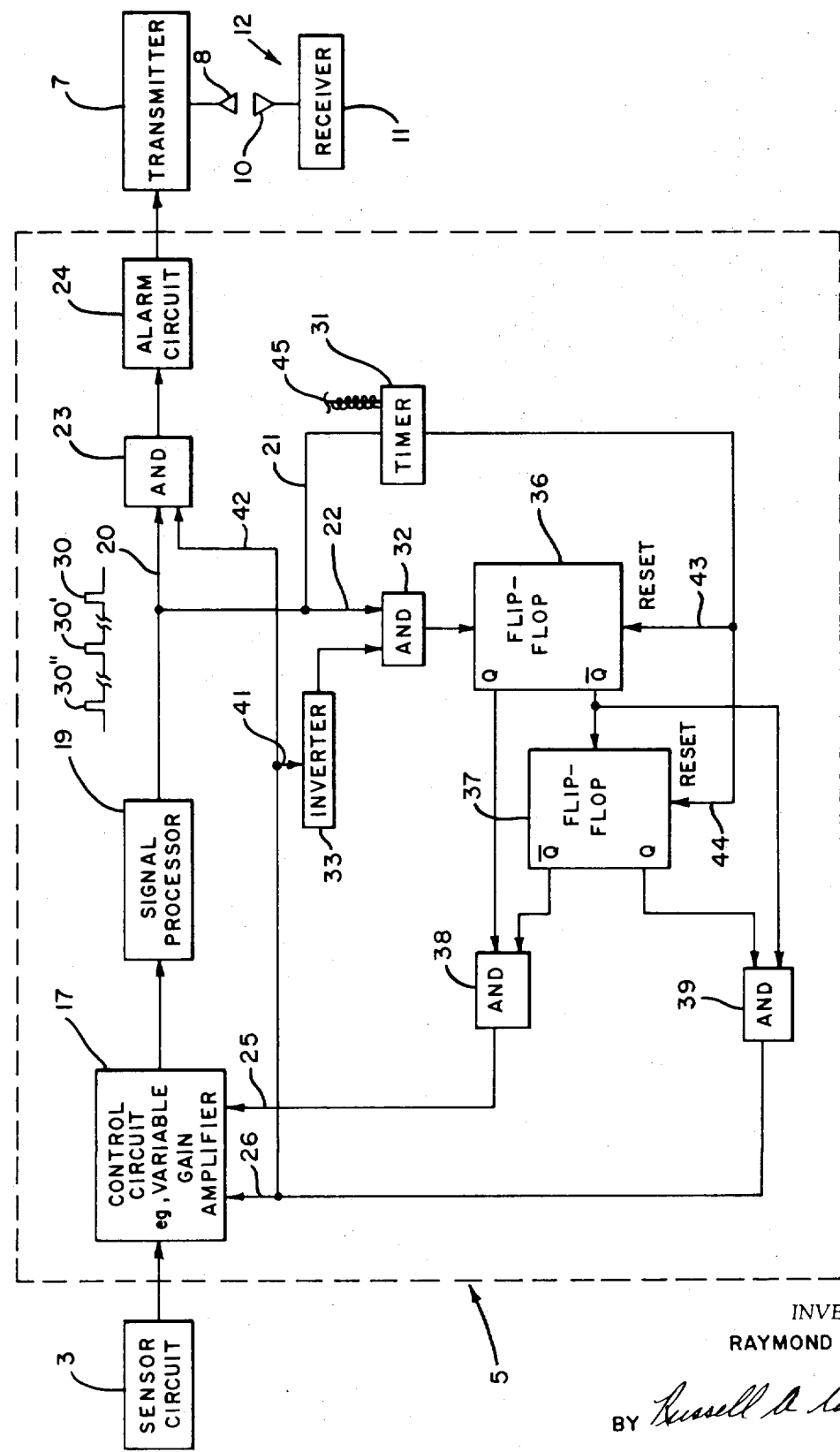
FIG. 1 is a schematic block diagram of an intrusion detection system embodying this invention.
Figure 2:
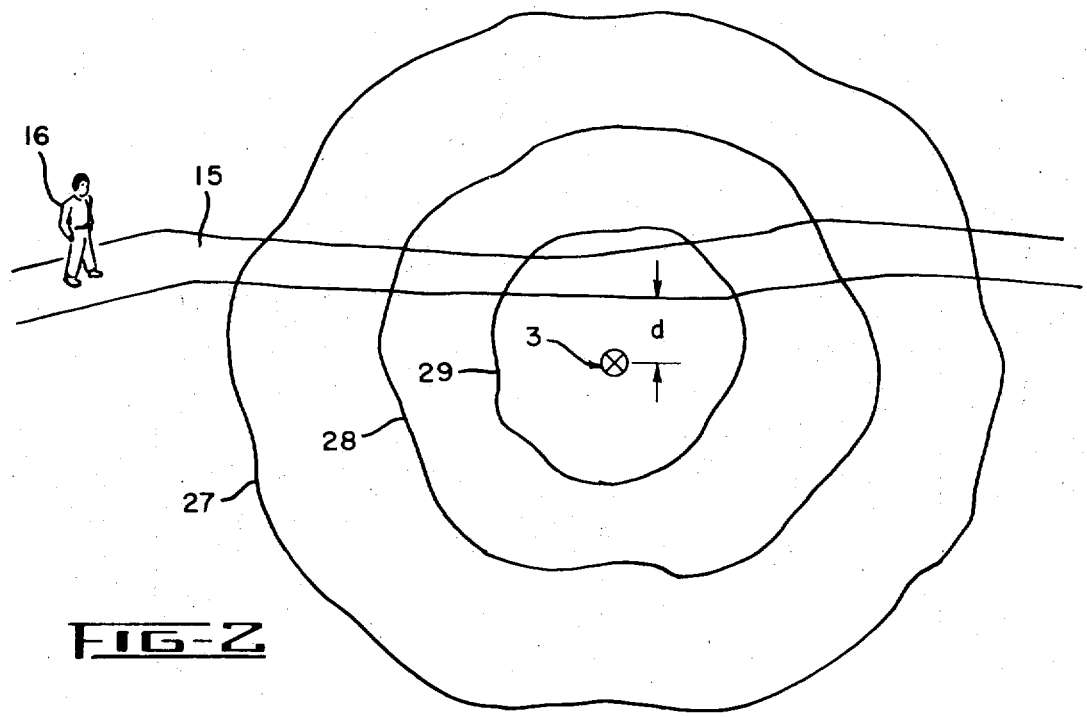
FIG. 2 is a schematic diagram illustrating the successively smaller areas of detection associated with the system of FIG. 1.

Referring now to FIG. 1, an intrusion detection system embodying this invention comprises a sensor circuit 3, processing circuit 5, transmitter 7, antennas 8 and 10, and receiver 11. Circuit 3 preferably comprises a point source sensor having a substantially circular area of detection. The sensor may, by way of example, be: a seismic detector such as a geophone; an acoustic sensor; a magnetic sensor of either the solenoid or flux gate variety; an electrostatic sensor which senses changes in the vertical component of the earth's electrostatic field; an ultrasonic sensor; an omni-directional radar without range gates; an olfactronic sensor; an omni-directional infrared (IR) sensor; etc.. The sensor circuit may be adjusted to provide a detection area that is other than circular. A geophone sensor 3 is placed in contact with the earth a short distance d from a path 15 as illustrated in FIG. 2. The spacing d is preferably much less than the maximum detection range associated with geophone 3. This system is particularly useful in detecting intruders 16 walking on path 15 past geophone 3.

Processing circuit 5 comprises control circuit 17, signal processor 19, AND gate 23, and alarm circuit 24. The control circuit preferably comprises a variable gain amplifier. Alternatively, circuit 17 may comprise an amplifier and a variable attenuator. The gain of amplifier 17 essentially determines the sensitivity of the system and thus the size of the detection area provided by the geophone 3. During quiescent operation prior to detection of an intruder by the system, amplifier 17 is biased by the signals on lines 25 and 26 to have a maximum gain so that the maximum detection area corresponding to the area within curve 27 in FIG. 2 is associated with the geophone. In operation, amplifier 17 is sequentially responsive to control signals on lines 25 and 26 for automatically decreasing the gain thereof and thus the sizes of the detection areas to those within the curves 28 and 29, respectively.

Processor 19 analyzes the output of circuit 17 for producing on line 20 a signal indicating whether the amplified signal from geophone 3 was produced by an intruder walking on the path 15 within the detection area. The processor may be any one of the many types of signal processors used to discriminate between intruder and noise generated signals. By way of example, the processor may be a simple threshold detector or a more complex spectral discriminating processor which differentiates between signals generated by a walking intruder and noise signals by comparing the energy content of high and low frequency components of received signals. When it is determined that an intruder is present in the detection area, the processor produces an output pulse 30 that lasts for a short time interval such as 100 nano-seconds. The processor is then prevented from producing another output pulse indicating intrusion of the detection area for a longer time interval such as one second even though the intruder remains in the detection area.

The output of the processor is applied on line 20 to gate 23, on line 21 to timer circuit 31, and on line 22 to gate 32 which is enabled during quiescent operation by the output of inverter 33. The output of AND gate 32 controls the operation of a binary counter comprising circuits 36 and 37 which may be bistable multivibrators or flip-flops. The Q and $\overline{Q}$ outputs of flip-flops 36 and 37, respectively, control the operation of AND gate 38. The $\overline{Q}$ and Q outputs of flip-flops 36 and 37, respectively, control the operation of AND gate 39. The outputs of gates 38 and 39 are the control signals which are applied on lines 25 and 26, respectively, to amplifier 17. The output of gate 39 is also applied on line 41 to the inverter and on line 42 to gate 23.

Timer circuit 31 is set by the first output pulse 30 from processor 19. If a second pulse 30' is not produced by the processor within a first time interval, circuit 31 produces an output on lines 43 and 44 which resets the associated flip-flops 36 and 37. Similarly, if a third pulse 30" is not received within a second time interval, circuit 31 produces an output which resets the flip-flops. The flip-flops may also be reset by actuating spring loaded push button switch 45.

In the following operational description, the binary logic output levels of the components in FIG. 1 will be referred to as high and low. During quiescent operation when an intruder is outside of the detection area 27, the output of processor 19 is low; the Q and $\overline{Q}$ outputs of the flip-flops are low and high, respectively; the outputs of enabled gates 38 and 39 are low; gate 32 is enabled by the high output of the inverter; and gate 23 is disabled.

When an intruder 16 walks into the detection area bounded by curve 27, the seismic signals he produces in the ground are picked up by the geophone 3, amplified and processed. The high output pulse 30 from the processor, indicating that an intruder is moving in the detection area 27, enables gate 23 and closes gate 32. The low output on line 42 maintains gate 23 closed. The high output of gate 32 causes multivibrator 36 to change operating states. Since the Q and $\overline{Q}$ outputs of flip-flops 36 and 37, respectively, are now both high, the output of gate 38 is also high. This signal on line 25 causes the gain of amplifier 17 to decrease to reduce the size of the detection area to that bounded by the curve 28. The output of gate 39, however, is still low.

When the intruder 16 walks into the detection area 28, the second high output pulse 30' from processor 19 momentarily enables gate 23 and closes gate 32 to cause flip-flop 36 to again change operating states. Multivibrator 37 is responsive to the leading edge of the $\overline{Q}$ output of flip-flop 36 which is now high for changing operating states. Since both of the inputs to gate 39 are now high, the output thereof is also high. This output of gate 39 enables gate 23, disables gate 32, and causes the gain of amplifier 17 to again decrease to reduce the size of the detection area to that bounded by the curve 29.

When the intruder 16 walks into the smallest detection area 29, a high output pulse 30" is produced by the processor. This signal on line 20 closes gate 23 to actuate alarm circuit 24 which energizes the transmitter 7. Circuit 7 transmits an alarm signal to a central monitor facility 12 indicating that successive intrusion of the detection areas 27 – 29 have been detected and that there is an intrusion of a protected area adjacent geophone 3. In a self-contained unit the alarm device 24 may be a light or audio device for notifying a human observer of an intrusion of the protected area.

The processing circuit 5 may also be adjusted to operate such that the sensitivity of the system, i.e., the size of the detection area, is increased when an intruder moves out of existing detection area. Such a system would be useful in monitoring an intruder who moves away from the geophone 3, e.g., on the path 15 in FIG. 2.

Figure 3:
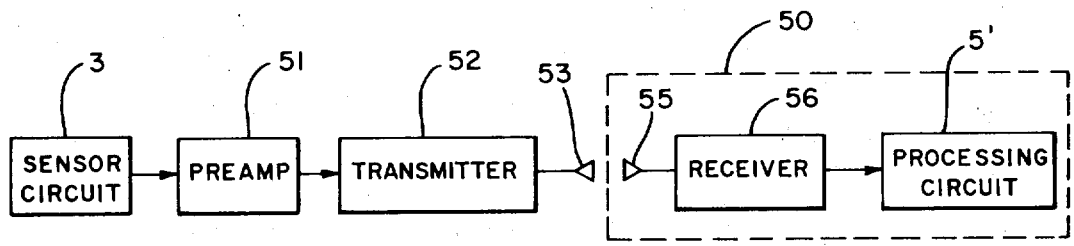
FIG. 3 is a schematic block diagram of an alternate embodiment of this invention where the sensor and processing circuitry are at different locations.

A modified form of this invention wherein signals produced by the sensor are transmitted to equipment in a central monitoring facility 50 for processing is illustrated in FIG. 3. Circuitry in the protected area comprises sensor circuit 3, preamplifier 51, transmitter 52 and antenna 53. An antenna 55, receiver 56 and processing circuit 5' are located at the central monitoring facility. The amplifier output of the sensor circuit modulates a radio frequency carrier signal that is transmitted by antenna 53. The signal received by antenna 55 is demodulated in the receiver and applied to the processing circuit for analysis and producing an indication of intrusion of the protected area. The processing circuit 5' is similar to the processing circuit 5 illustrated in FIG. 1.

Figure 4:
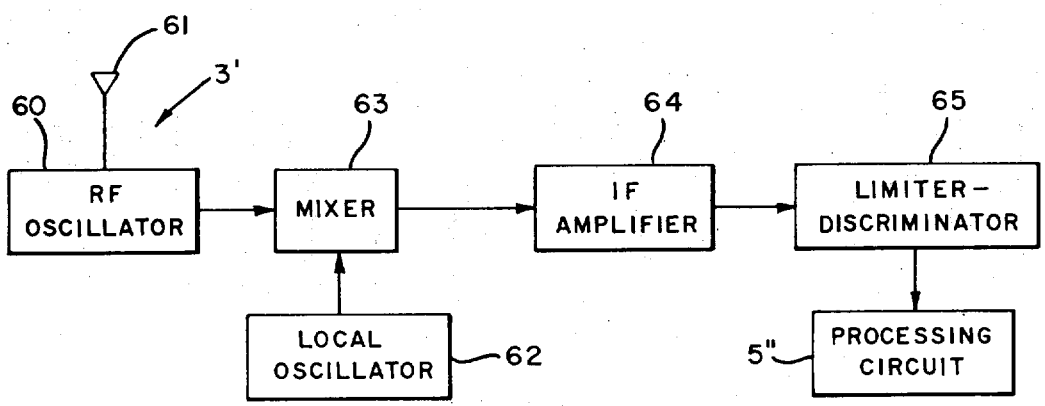
FIG. 4 is a schematic block diagram of a radio frequency (RF) intrusion detection system embodying this invention.

An alternate embodiment of this invention wherein a sensor circuit 3' comprises a radio frequency oscillator 60 loaded by an associated antenna 61 is illustrated in FIG. 4. The output of oscillator 60 is combined with a local oscillator signal from source 62 in a mixer 63 to produce an intermediate frequency (IF) signal that is amplified by circuit 64. The amplified signal is detected by limiter-discriminator 65 and applied to processing circuit 5" for analysis to determine whether an intruder is in the protected area. The processor circuit 5" is similar to the circuit 5 in FIG. 1. The output voltage of the discriminator is proportional to the frequency of oscillation of RF oscillator 60. The closer an intruder is to the antenna 61, the larger the change in the frequency of oscillation of oscillator 60 and the output voltage of discriminator 65. In this system, the control circuit 17 and processor 19 may comprise a multi-level threshold circuit. The size of the detection area is decreased by increasing the magnitude of the threshold level of circuit 17.

When an intruder is absent from the protected area associated with antenna 61, the frequency of oscillation of oscillator 60 is constant. The output voltage of discriminator 65 is therefore a constant value which is less than the threshold levels in circuit 5" and intrusion of the protected area is not indicated. When an intruder is in the detection area associated with the system, however, he loads the antenna and thus oscillator 60. This causes the frequency of oscillation of circuit 60 to decrease. The magnitude of the frequency pulling of oscillator 60 increases as the intruder approaches antenna 61. The change in the output voltage of the discriminator is detected and analyzed by circuit 5" for varying the size of the detection area and indicating intrusion of a protected area.

Figure 5:
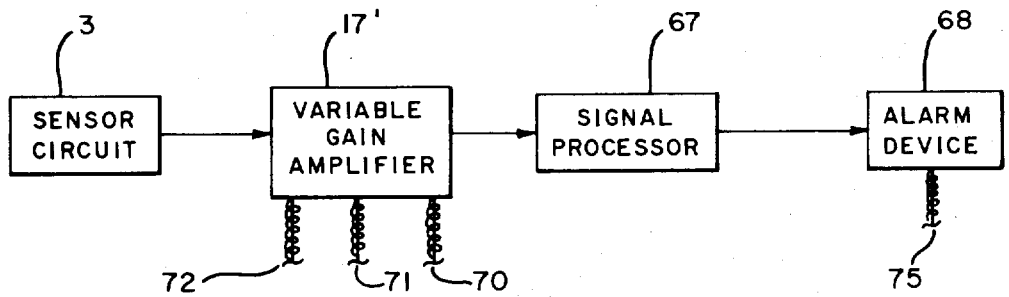
FIG. 5 is a schematic block diagram of an alternate embodiment of this invention in which the size of the detection area provided by the sensor is manually controlled by a human operator.

In certain applications it may be desirable that a human operator located in a protected area be able to selectively manually control the system sensitivity (i.e., the size of the detection area) for determining whether an intruder is approaching or leaving a particular restricted area. A system for accomplishing this function is illustrated in FIG. 5 and comprises a sensor circuit 3, variable gain amplifier 17', processor 67 and alarm device 68. The gain of the amplifier is changed manually by actuating spring loaded push button switches 70 – 72. Actuation of switch 70 causes the amplifier to have a maximum gain such that the system has a maximum sensitivity and the largest detection area defined by the curve 27 in FIG. 2. The gain of the amplifier is decreased for providing the detection areas within curves 28 and 29 by actuating switches 71 and 72, respectively. The spring loaded switch 75 enables an operator to manually override an alarm indication produced by device 68 when changing the size of the detection area.

During quiescent operation prior to detection of an intruder, the sensitivity of the system in FIG. 5 is adjusted to be maximum. When an intruder is first detected in the area 27 and an alarm such as a light is generated, the operator may actuate switch 75 to reset alarm device 68 and suppress the alarm indication for a period of time. If intrusion of the detection area is again indicated when switch 75 is released, the operator may selectively actuate switches 70 – 73 and 75 to suppress the alarm indication and vary the system sensitivity and size of the detection area for determining whether there is actually an intrusion of a protected area and the location thereof.

Alternatively, an operator may selectively place sensors having overlapping areas of detection about a central point where he is located with the associated amplifiers, processors and alarm devices for selectively varying the sensitivities thereof for more accurately detecting an intrusion of a protected area and determining the location of the intruder.

Figure 6:
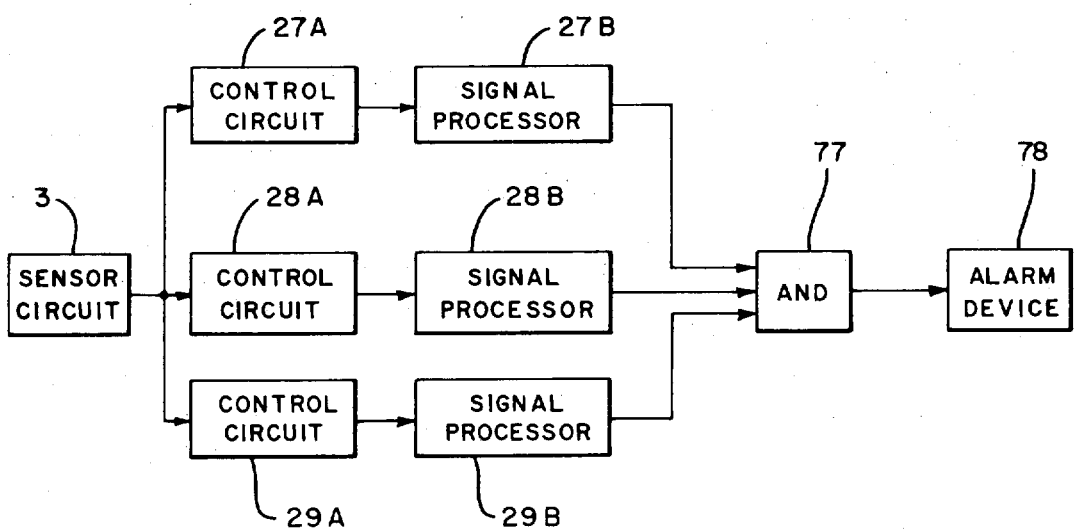
FIG. 6 is a block diagram of an alternate embodiment of this invention wherein detection areas of different sizes are established simultaneously.

A system wherein a single sensor circuit 3 is employed to simultaneously establish the detection areas 27, 28 and 29 is illustrated in FIG. 6. Associated control circuits A and processors B are employed with the sensor circuit 3 for establishing and determining intrusion of the detection areas. Outputs of a prescribed number of processors B are required to close AND gate 77 for actuating alarm device 78 to indicate intrusion of the protected area.

What is claimed is:

1. Intrusion detection apparatus comprising means comprising a single sensor and circuit means for selectively establishing during a suspected intrusion into an area of detection a plurality of areas of detection of different and predetermined sizes, and
    means responsive to said sensor and circuit means for determining intrusion of an area of detection.

2. Intrusion detection apparatus comprising means comprising a single sensor and circuit means for selectively simultaneously establishing a plurality of areas of detection of different and predetermined sizes, and
    means responsive to said sensor and said circuit means for determining intrusion of an area of detection.

3. Intrusion detection apparatus comprising
    means for selectively and automatically sequentially establishing a plurality of areas of detection of different and predetermined sizes comprising
    a single sensor,
    a control circuit responsive to the output of said sensor, said control circuit having different operating states associated therewith for causing detection areas of different sizes to be associated with said sensor,
    said determining means being responsive to the output of said control circuit for producing an output signal indicating intrusion of an associated detection area,
    first logic means sequentially responsive to each one of N outputs, where N is a positive interger greater than zero, of said determining means indicating intrusions of the associated detection areas for automatically biasing said control circuit to change the operating state thereof and thus the size of the detection area, and responsive to the $N+1^{th}$ output of said determining means for producing an alarm signal indicating intrusion of a protected area associated with the detection areas, and
    means for determining intrusion of an area of detection.

4. Apparatus according to claim 3 wherein said establishing means comprises a timing circuit responsive to the output of said determining means for resetting said first logic means and thus said control circuit when an output of said determining means indicating intrusion of a detection area is not produced during a predetermined time interval.

5. Apparatus according to claim 3 wherein said sensor circuit comprises a radio frequency oscillator and an antenna loading said oscillator.

6. Apparatus according to claim 3 including means for coupling the output of said sensor to said control circuit, said coupling means comprising
    first means for transmitting signals from said sensor, and
    first means for receiving signals from said first transmitting means,
    said sensor and said first transmitting means being located at a detection area,
    said first receiving means, control circuit, determining means and first logic means being located at a monitor facility remote from said sensor circuit.

7. Apparatus according to claim 3 including
    second means responsive to the output of said first logic means for transmitting said alarm signal, and
    second means receiving signals from said second transmitting means,
    said establishing means, determining means and second transmitting means being located at a detection area,
    said second receiving means being located at a monitor facility remote from said sensor circuit.

8. Apparatus according to claim 3 wherein said first logic means comprises
    a binary counter circuit receiving the output signal of said determining means,
    second logic means responsive to the contents of said counter circuit for automatically biasing said control circuit to vary the operation thereof to sequentially change the sizes of the detection areas in response to successive output signals of said determining means indicating intrusions of detection areas, and
    a first logic circuit simultaneously responsive to the output of said determining means and an output of said second logic means for producing an alarm signal.

9. Apparatus according to claim 8 wherein the sizes of the sequentially established detection areas are progressively smaller.

10. The method of detecting an intrusion of a protected area comprising the steps of
establishing with a single sensor a first area of detection associated with the protected area,
establishing with said sensor a second area of detection associated with the protected area, at least part of said first and second detection areas overlapping,
detecting intrusion of said first area,
detecting intrusion of said second area, and
producing an alarm indicating intrusion of the protected area after intrusions of the first and second areas are detected.

11. The method according to claim 10 wherein said areas are established simultaneously.

12. The method according to claim 10 wherein said second detection area is established only after detecting intrusion of said first area.

13. Intrusion detection apparatus comprising
means comprising a single sensor for selectively and simultaneously establishing a plurality of areas of detection of different and predetermined sizes,
said establishing means comprising a plurality of control circuits each responsive to the output of said sensor and each causing said sensor to have a detection area of a different size, and
means for determining intrusion of an area of detection.

14. Apparatus according to claim 13 wherein said determining means comprises
a plurality of signal processor circuits each responsive to the output of an associated control circuit for producing an output indicating whether there is an intrusion of the associated detection area, and
logic means responsive to the outputs of said processors for producing an indication of intrusion of a protected area associated with said detection areas when the outputs of a prescribed number of said processors indicate intrusion of the associated detection areas.

15. Intrusion detection apparatus comprising means comprising a single sensor and circuit means for selectively and automatically sequentially establishing during a suspected intrusion into an area of detection a plurality of areas of detection of different and predetermined sizes, and
means for determining intrusion of an area of detection.

16. The method of detecting an intrusion of a protected area comprising the steps of
establishing with a single sensor a first area of detection associated with the protected area,
establishing with said sensor a second area of detection associated with the protected area, at least part of said first and second detection areas overlapping,
detecting intrusion of said first area,
detecting intrusion of said second area, and
producing an alarm indicating intrusion of the protected area only after simultaneous detection of intrusions of the first and second areas.

17. The method of detecting an intrusion of a protected area comprising the steps of
establishing with a single sensor a first area of detection associated with the protected area,
detecting intrusion of said first area,
establishing with said sensor after detecting intrusion of said first area a second area of detection smaller than and located within said first detection area,
detecting intrusion of said second area, and
producing an alarm indicating intrusion of the protected area after intrusions of the first and second areas are detected.

* * * * *